United States Patent
Dyer et al.

(10) Patent No.: US 10,126,836 B2
(45) Date of Patent: Nov. 13, 2018

(54) SOFTWARE CURSOR POSITIONING SYSTEM

(71) Applicants: Lioudmila L. Dyer, Davenport, FL (US); Stuart C. Dyer, Davenport, FL (US); Valerie Sibirsky Williams, Lovettsville, VA (US)

(72) Inventors: Lioudmila L. Dyer, Davenport, FL (US); Stuart C. Dyer, Davenport, FL (US); Valerie Sibirsky Williams, Lovettsville, VA (US)

(73) Assignee: Lioudmila Dyer, Davenport, FL (US)

( * ) Notice: Subject to any disclaimer, the term of this patent is extended or adjusted under 35 U.S.C. 154(b) by 55 days.

(21) Appl. No.: 14/792,350

(22) Filed: Jul. 6, 2015

(65) Prior Publication Data

US 2015/0324012 A1   Nov. 12, 2015

Related U.S. Application Data

(63) Continuation-in-part of application No. 13/205,621, filed on Aug. 9, 2011, now abandoned.

(60) Provisional application No. 61/374,679, filed on Aug. 18, 2010.

(51) Int. Cl.
   *G06F 9/44*     (2018.01)
   *G06F 3/033*    (2013.01)
   *G06F 3/0354*   (2013.01)
   *G06F 3/044*    (2006.01)
   (Continued)

(52) U.S. Cl.
   CPC .......... *G06F 3/033* (2013.01); *G06F 3/03543* (2013.01); *G06F 3/044* (2013.01); *G06F 9/451* (2018.02); *G06Q 10/04* (2013.01)

(58) Field of Classification Search
   CPC .......... G06F 8/24; G06F 9/4428; G06F 9/443; G06F 9/548; G06F 17/30607; Y10S 707/99944; Y10S 707/99945; Y10S 707/99931; Y10S 707/955; Y10S 707/99947; Y10S 715/967;
   (Continued)

(56) References Cited

U.S. PATENT DOCUMENTS 5,898,419 A * 4/1999 Liu ................... G06F 3/0481
                                              345/660
6,323,884 B1   11/2001 Bird
   (Continued)

FOREIGN PATENT DOCUMENTS

RU           2325786 C2      5/2008

OTHER PUBLICATIONS

Michael J. Kristan et al., Cursor-on-Target Message Router User's Guide, Mitre, 2009, retrieved online on Sep. 25, 2018, pp. . Retrieved from the Internet: <URL: https://www.mitre.org/sites/default/files/pdf/09_4937.pdf>. (Year: 2009).*

*Primary Examiner* — Hanh Thi-Minh Bui
(74) *Attorney, Agent, or Firm* — M U Patents

(57) ABSTRACT

A method of positioning a cursor has the steps of registering the session on database tables, the user making a choice with an input device regarding cursor positioning, registering the choice within the tables, and repositioning the cursor to the most frequent cursor position in the tables. The choice of cursor position may be determined by a GetCursorPos function in a Windows-based computer, and the cursor may be repositioned by a SetCursorPos function.

6 Claims, 2 Drawing Sheets

(51) Int. Cl.
*G06Q 10/04* (2012.01)
*G06F 9/451* (2018.01)
(58) Field of Classification Search
CPC .......... G05B 2219/23255; G05B 2219/13144; G05B 2219/13148
See application file for complete search history.

(56) References Cited

U.S. PATENT DOCUMENTS

| | | | |
|---|---|---|---|
| 8,943,425 B2* | 1/2015 | Wickramasuriya | G06F 3/0481 715/764 |
| 2002/0030754 A1* | 3/2002 | Sugimoto | H04N 5/23293 348/333.02 |
| 2002/0158920 A1 | 10/2002 | Abrams | |
| 2004/0059782 A1 | 3/2004 | Sivertsen | |
| 2005/0114779 A1* | 5/2005 | Griesmer | G06F 8/33 715/711 |
| 2005/0216866 A1 | 9/2005 | Rosen | |
| 2006/0004680 A1 | 1/2006 | Robarts | |
| 2006/0218503 A1 | 9/2006 | Matthews et al. | |
| 2008/0033823 A1 | 2/2008 | Monteverde | |
| 2008/0281794 A1 | 11/2008 | Mathur | |
| 2010/0325100 A1 | 12/2010 | Forstall et al. | |
| 2011/0018812 A1* | 1/2011 | Baird | G06F 3/04886 345/173 |
| 2011/0175701 A1 | 6/2011 | Kobayashi | |
| 2011/0201387 A1* | 8/2011 | Paek | G06F 3/0237 455/566 |
| 2012/0011445 A1 | 1/2012 | Gilboa | |
| 2012/0017182 A1 | 1/2012 | Bau | |
| 2012/0169613 A1* | 7/2012 | Armstrong | G06F 3/04886 345/173 |
| 2013/0002534 A1* | 1/2013 | Braun | G06F 1/163 345/156 |
| 2013/0073546 A1 | 3/2013 | Yan et al. | |
| 2013/0091457 A1 | 4/2013 | Ferri | |
| 2015/0022449 A1* | 1/2015 | Cheng | G06F 3/0346 345/163 |

\* cited by examiner

SOFTWARE CURSOR POSITIONING SYSTEM

CROSS-REFERENCE TO RELATED APPLICATION

The present application is a continuation-in-part of, and claims priority to, U.S. Nonprovisional patent application Ser. No. 13/205,621 filed on Aug. 9, 2011, entitled "Use of Structures/Statistics in Software Optimization" which claims benefit of U.S. Provisional Patent Application 61/374,679 filed on Aug. 18, 2010, the entire disclosures of which are incorporated by reference herein.

BACKGROUND OF THE INVENTION

1. Field of Invention

This invention relates to cursor positioning in computer interfaces.

2. Description of Related Art

Prior art consists of placing the cursor at the same position on the screen where the cursor was previously positioned, at the top of the page or any place on the screen. This is common for browsers in particular such as Internet Explorer, Google Chrome or Mozilla Firefox. Other software applications also suffer from poor cursor placement which impedes a user's engagement with the system and wastes his or her time.

The prior art places the cursor at the first blank on a form on a website, or doesn't place it at all, wherein it must be placed by a cursor. For example when user clicks on—a pop-up menu listing several operations the prior art list will select the first option, which is usually based on alphabetical or numerical order.

Another example in the prior art describes the case, when data has to be entered into the form. If an error is found in one of the fields after the form is submitted, despite the system knowing where the error is located, the cursor is not positioned on the field with erroneous value, rather on the first field in the form.

Therefore there is a need for a predictive cursor positioning system that enables an advance determination of the most advantageous positioning for the cursor in a given scenario, to reduce effort on the part of the viewer.

SUMMARY OF THE INVENTION

The present invention overcomes these and other deficiencies of the prior art by providing a method of positioning a cursor that has the steps of registering the session on database tables, the user making a choice with an input device regarding cursor positioning, registering the choice within the tables, and repositioning the cursor to the most frequent cursor position in the tables. The choice of cursor position may be determined by a GetCursorPos function in a Windows-based computer. The cursor may be repositioned by a SetCursorPos function.

The method may have the further step of the user moving an input device to a preferred cursor position. The input device may be a computer mouse, and it may use laser or one or more rollers to track movement. The input device may also be a trackpad and may use resistive or capacitive sensing to track movement.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
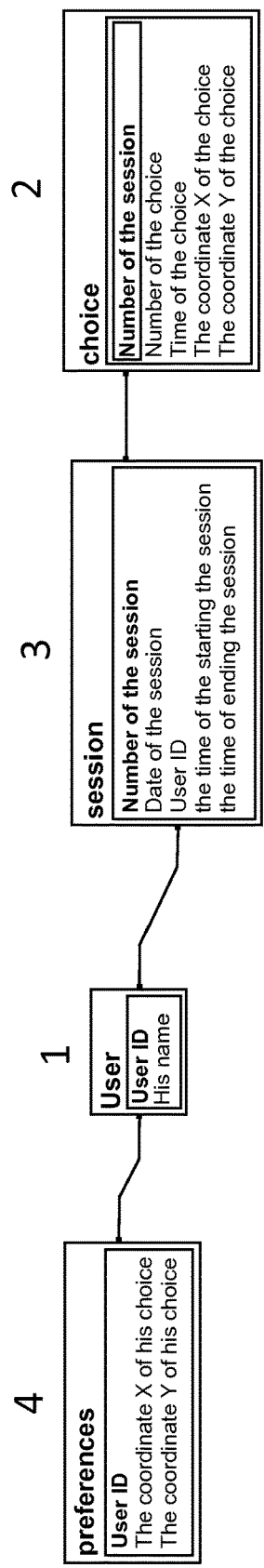
FIG. 1 shows a database schema for the cursor position management, according to an embodiment of the present invention.
Figure 2:
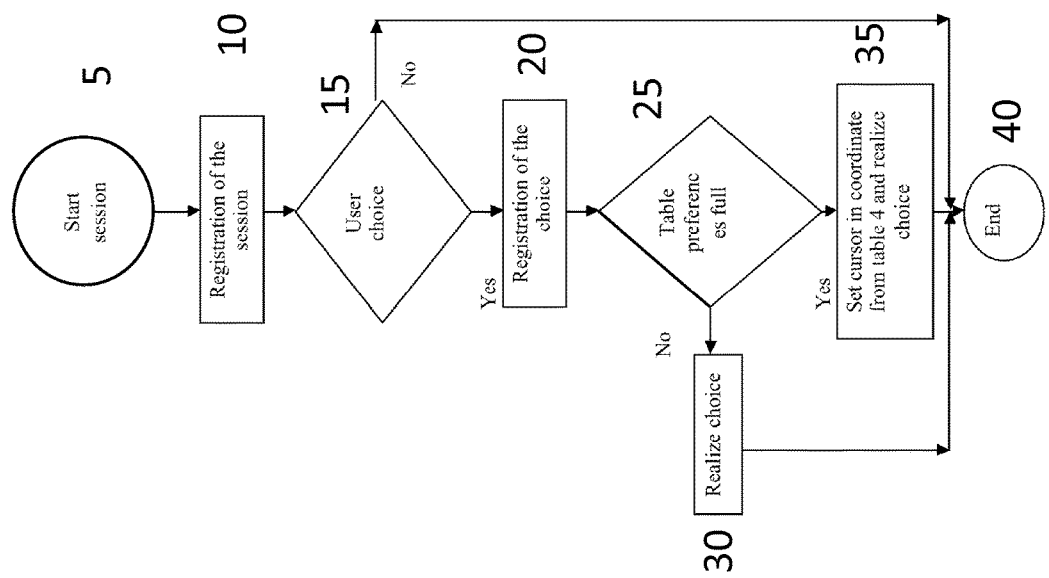
FIG. 2 shows a flowchart of the method of cursor position management, according to an embodiment of the present invention.

Preferred embodiments of the present invention and their advantages may be understood by referring to FIGS. 1-2 wherein like reference numerals refer to like elements.

The present invention provides a predictive cursor positioning by using statistics of user preferences.

One method of cursor positioning involves placing the cursor at the desired point on the screen which has been chosen by the programmer based on statistics from observing the typical behavior of a user of the application. This can be done by using for example function Windows API— SetCursorPos to set the cursor to a specified location. With SetCursorPos, you can move the pointer anywhere on the screen and obviously it is better to position the cursor in the most usable position (i.e. where the user has to move the cursor the least) according to statistics analysis at this stage.

Another method of cursor positioning is user configured wherein the user decides through a control interface where he or she would like the cursor to be positioned. The user has a possibility to configure (set up) the browser, where through a dialogue he may indicate his desired position on the screen for a given scenario, in other words where the cursor will be placed when the user is performing functions with the browser or software.

Random or missing cursor positioning or selection. For example, when user clicks on a pop-up menu lists several operations without selecting the most frequently used operation. Let us consider random cursor positioning. Generality (failure to consider the specifics of the problem) sets the cursor in a random position, even though a simple question "why randomly?" will lead to reconsideration and to a decision to position the cursor on the most used option, which will result in time savings.

In addition to determining problem's statistics prior to software development stage, one could accumulate statistics and determine the statistics of user preferences at the prototype or testing stage.

The preferred method of cursor positioning within a website or software is placing the cursor at the screen of the most popular in terms of statistics. The statistics involve determining the frequency of user cursor positioning at certain times. In order to derive meaningful statistical correlation, it is necessary to have a database for a period of time about the information of the user positioning of the cursor on the screen, and where the user clicks the mouse (or presses ENTER). These positions at given times can be collected with the help of functions GetCursorPos (in a Windows-based computer), which returns the current cursor position. At any moment the most usable position on the screen calculated based on statistics collected to this moment, and the cursor is placed at this most useful position.

It is necessary to mention that statistics analysis is one of the simpler ways of the use of specific problem for example, by the frequency the function is used.

A decision to position the cursor on the most useful position at a given time will result in savings of time, energy and frustration. Additionally, it will improve the user experience and increase user satisfaction. Further, depending on the application, there may be an additional safety measure and a reduction in errors.

There is also an option of creating a built-in dynamic optimization module designed to automatically adjust software settings or options based on the data collected during actual software use. In other words, determination or improvement of problem's structure leading to product optimization is possible throughout the software development lifecycle.

In an example of the implementation of the method, the implementation goes through three stages: I. Initial System Design Stage: System Developers communicate with End-Users to identify/collect System Requirements in order to determine problem's structure. II. System Development Stage: System Developers develop the System and improve it based on the real data/statistics, which is either collected and provided by the End-User or collected by System Developers at the time of prototype System runs. I.e. real-time data/statistics is used to determine or improve problem's structure. III. Quality Assurance/Testing Stage: The System is further improved based on the results of the test runs performed during the Quality Assurance Stage to determine or improve problem's structure.

End-Users Test the System and Provide Feedback

Technical Writers insert Flags in the Product Manual to accompany the System to be tested. These Flags let End-Users know about the possibility to change certain System options. End-users test the System paying specific attention to the Flags inserted in the Product Manual and provide feedback to System Developers.

Post System Deployment Stage may have one or more further substages: a. Built-in Dynamic Optimization Module designed to automatically adjust Software settings/options/lists based on the data collected during actual System runs. Software is adjusted dynamically, as needed, depending on the actual System use; and b. in addition to automatic optimization, offer end-users a possibility to manually modify some options of the completed and delivered System.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

With reference to FIG. 1, in order to implement the method of cursor positioning using statistical analysis, the structure of the data base may be as follows involving four tables in an embodiment:

1. Table of data about the user with fields
    a. User ID,
    b. his name,
2. Table of data about a session with fields
    a. Number of the session,
    b. Date of the session,
    c. User ID,
    d. the time of the starting the session,
    e. the time of ending the session.
3. Table of data about the choice of the cursor position in the current session with the fields
    a. Number of the session,
    b. Number of the choice,
    c. Time of the choice,
    d. The coordinate X of the choice
    e. The coordinate Y of the choice
   Note: These positions can be collected with the help of functions GetCursorPos.
4. Table of data about users' preferences
    a. User ID,
    b. The coordinate X of his choice,
    c. The coordinate Y of his choice.

Table 4 has the fields for the coordinates of the user's choice (there are two ways to calculate the coordinates of the choice: as a simple way of the most preference choice or as a value calculated by the method of the least squares). The method of least squares is a standard approach in regression analysis to the approximate solution of over determined systems, i.e., sets of equations in which there are more equations than unknowns. "Least squares" means that the overall solution minimizes the sum of the squares of the errors made in the results of every single equation.

At the beginning of a session the user opens the browser and the four first fields are recorded in Table 2: unique number of the session (automatically generated); date of the session (taken from the operating system), the user unique number (taken from the operating system and Table 1), the time of the session commencement (taken from the operating system).

When user makes his choice in the browser he clicks by the mouse at the screen, and all fields are recorded in Table 3: session number, number of his choice, time of the choice (time of the clicking by mouth), the coordinate X of his choice, the coordinate Y of his choice. After the user has made the choice H the following fields are recorded in Table 4: user's number, the coordinate X of his choice, the coordinate Y of his choice. The next choice the user makes when the cursor position already was set up for him to a specified location—most preference for this user—by using for example function Windows API—SetCursorPos.

There is also an option of creating a built-in dynamic optimization module designed to automatically adjust software settings or options based on the data collected during actual software use.

a. Built-in Dynamic Optimization Module designed to automatically adjust Software settings/options/lists based on the data collected during actual System runs. Software is adjusted dynamically, as needed, depending on the actual System use.

b. In addition to automatic optimization, offer end-users a possibility to manually modify some options of the completed and delivered System.

A pointing device such as a mouse is used to provide input from the user to the software. A touchpad may also be used. In either case, the pointing device receives movement from the user and translates the movement into an electronic movement of the cursor on the screen. This is performed through a ball or wheels that roll with movement of the mouse, in the case of an analog mouse, or a laser or other light which tracks movement along a surface. A touchpad incorporates variable resistance or capacitance in order to determine the position of a finger on the touchpad surface.

The previous movements of the mouse may be used to establish a pattern in order to anticipate the next movement. For example, if a predictive cursor position is selected, and the user always moves away from the selected to position to another position, the selected position is wrong and the predictive system updates to the preferred position, based on usage history.

With reference to FIG. 2, a method of managing cursor position is shown. In step 5, the session is started, and in step 10 the registration of the session commences within the tables 1-4. In step 15, the user makes a choice regarding cursor positioning. In step 20, the choice is registered. In step 25, it is determined if the table preference is full. If not, then is step 30 the user choice is realized and stored in the table and the cursor is repositioned to the most frequent cursor position registered in the table. If the preference is table is full then at step 35 the cursor is repositioned to the most frequent cursor position registered in the table. At step 40 the cursor positioning subroutine ends.

This description is set for the "Windows" operating system. For the "Macintosh" operating system, the steps of the algorithm are similar, but the following functions "GetCursorPos" and "SetCursorPos" are not used in "Macintosh" system, however there are other supporting programs which have these functions, for example,—Quartz Display Services. Quartz Display Services provides direct access to certain low-level features in the OS X window server related to the configuration and control of display hardware. You can change the location of the mouse cursor on a specific display by calling the function CGDisplayMoveCursorToPoint. This function takes two parameters, a display ID and a point. The location of the point is relative to the origin or upper-left corner of the display. You can also change the location of the mouse cursor to any display by calling the function CGWarpMouseCursorPosition. This function takes a single parameter, a point in global display coordinates. Calling either of these functions does not generate a mouse event.

Thus, it is clear that all the operating systems can be divided into two groups. The first group, where there is a built-in operating system functions to manage the movement of the cursor (for example, "Windows") and the second group where there is no such functions (for example, "Mac OS"), but there are additional programs which are able to do the same functions for such operating systems, and other operating systems.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A computer program method for a computer user, manipulating a cursor of a user's computing device, for assisting the user of a computing apparatus in a task of selection of the cursor position on a screen coordinates comprising the steps of:

a. an information system-connected server collecting data on a user's computing activity within the information system;
b. the server determining potentially next element that the user will interact with and
c. the server pre-determining and placing a cursor of the computing device at initiation of a display coordinates according to a statistics of the user's activity, wherein the predetermination and placing of the cursor to optimize operation for the user,
wherein if the user docs not want to accept the cursor position, the user can manipulate the cursor to an alternative position;
wherein an error is found in one of a plurality of fields a form is submitted the cursor is placed on the error; and
wherein the user decides through a control interface where he or she would like the cursor to be positioned; the user has a possibility to configure (set up) a browser, where through a dialogue he may indicate his/her desired position on the screen for a given scenario.

2. The method of claim 1, wherein if the user accepts the cursor position, the method further comprises the step of the server relocating the cursor to a new position on a subsequent screen, the new cursor position being based on the user's activity.

3. The method of claim 1, wherein the cursor is placed based on statistics analysis at this stage from observing typical behavior of the user.

4. The method of claim 1, wherein the user decides through a control interface where the user would like the cursor to be positioned.

5. The method of claim 1, wherein the information system is selected from the group consisting of an Internet network, an intranet network, and a computer network.

6. A computer program method for a computer user, manipulating a cursor of a user's computing device, for assisting the user of a computing apparatus in a task of selection of the cursor position on a screen coordinates comprising the steps of:

a. an information system-connected server collecting data on computing activity of a user and any other users within the information system;
b. the server determining potentially next element that the user will interact with and
c. the server pre-determining and placing a cursor of the computing device at initiation of a display coordinates according to a statistics of the activity of the user and any other user, wherein the predetermination and placing of the cursor to optimize operation for the user,
wherein if the user does not want to accept the cursor position, the user can manipulate the cursor to an alternative position;
wherein an error is found in one of a plurality of fields a form is submitted the cursor is placed on the error; and
wherein the user decides through a control interface where he or she would like the cursor to be positioned; the user has a possibility to configure (set up) a browser, where through a dialogue he may indicate his/her desired position on the screen for a given scenario.

* * * * *